(12) United States Patent
Takaoka

(10) Patent No.: US 11,414,840 B2
(45) Date of Patent: Aug. 16, 2022

(54) CONTROL SYSTEM FOR WORK MACHINE, METHOD, AND WORK MACHINE

(71) Applicant: KOMATSU LTD., Tokyo (JP)

(72) Inventor: Yukihisa Takaoka, Tokyo (JP)

(73) Assignee: KOMATSU LTD., Tokyo (JP)

( * ) Notice: Subject to any disclaimer, the term of this patent is extended or adjusted under 35 U.S.C. 154(b) by 400 days.

(21) Appl. No.: 16/636,968

(22) PCT Filed: Nov. 22, 2018

(86) PCT No.: PCT/JP2018/043227
§ 371 (c)(1),
(2) Date: Feb. 6, 2020

(87) PCT Pub. No.: WO2019/116856
PCT Pub. Date: Jun. 20, 2019

(65) Prior Publication Data
US 2021/0148091 A1 May 20, 2021

(30) Foreign Application Priority Data

Dec. 14, 2017 (JP) .............................. JP2017-239775

(51) Int. Cl.
*E02F 9/26* (2006.01)
*E02F 3/84* (2006.01)

(52) U.S. Cl.
CPC .............. *E02F 9/262* (2013.01); *E02F 3/841* (2013.01)

(58) Field of Classification Search
CPC ......... E02F 9/262; E02F 3/841; E02F 3/7618; E02F 9/265; E02F 9/2228; E02F 3/844; E02F 9/205; G05D 1/02
See application file for complete search history.

(56) References Cited

U.S. PATENT DOCUMENTS

| 6,108,949 A | 8/2000 | Singh et al. |
| 8,639,393 B2 | 1/2014 | Taylor et al. |
| 2016/0076222 A1 | 3/2016 | Taylor et al. |
| 2019/0093319 A1* | 3/2019 | Elkins ..................... E02F 3/847 |
| 2019/0101641 A1* | 4/2019 | Hogan .................. G01S 13/885 |

FOREIGN PATENT DOCUMENTS

| JP | 11-247230 A | 9/1999 |
| JP | 2014-119349 A | 6/2014 |
| WO | WO-2018179384 A1 * | 10/2018 ............ B60W 30/10 |

OTHER PUBLICATIONS

The International Search Report for the corresponding international application No. PCT/JP2018/043227, dated Feb. 19, 2019.

* cited by examiner

*Primary Examiner* — Alvaro E Fortich
*Assistant Examiner* — Zannatul Ferdous
(74) *Attorney, Agent, or Firm* — Global IP Counselors, LLP

(57) ABSTRACT

A controller acquires a size of a recess included in an actual topography within a work range. The controller determines whether the size of the recess is larger than a predetermined recess threshold. When the size of the recess is larger than the predetermined recess threshold, the controller determines a first area and a second area divided at a position of the recess in the work range. The controller determines a first target design topography indicative of a target trajectory of a work implement for the first area. The controller generates a command signal to operate the work implement according to the first target design topography.

20 Claims, 15 Drawing Sheets

CONTROL SYSTEM FOR WORK MACHINE, METHOD, AND WORK MACHINE

CROSS-REFERENCE TO RELATED APPLICATIONS

This application is a U.S. National stage application of International Application No. PCT/JP2018/043227, filed on Nov. 22, 2018. This U.S. National stage application claims priority under 35 U.S.C. § 119(a) to Japanese Patent Application No. 2017-239775, filed in Japan on Dec. 14, 2017, the entire contents of which are hereby incorporated herein by reference.

BACKGROUND

The present invention relates to a control system for a work machine, a method, and a work machine.

BACKGROUND INFORMATION

Conventionally, a system that automatically controls a work machine has been proposed in order to work efficiently in a work machine, such as a bulldozer or a grader. For example, in the system of U.S. Pat. No. 8,639,393, a controller sets in advance a target profile for a work implement to move at a work site from the topography of the work site or the like and operates the work implement along the target profile.

SUMMARY

The above system generates a plurality of target profiles displaced by a predetermined height downward from the surface of the actual topography, and performs excavation sequentially from the upper target profile. However, in the above system, when excavating topography having large unevenness, the work machine travels over the unevenness many times. Therefore, work efficiency will fall.

An object of the present invention is to suppress a decrease in work efficiency when excavating a topography having large unevenness.

A first aspect is a control system for a work machine including a work implement and comprises a controller. The controller is programmed to perform the following processing. The controller acquires actual topography data indicative of an actual topography. The controller acquires work range data indicative of a work range. The controller acquires a size of a recess included in the actual topography within the work range. The controller determines whether the size of the recess is larger than a predetermined recess threshold. When the recess is larger than the predetermined recess threshold, the controller determines a first area and a second area divided at a position of the recess in the work range. The controller determines a first target design topography indicative of a target trajectory of the work implement for the first area. The controller generates a command signal for operating the work implement according to the first target design topography.

A second aspect is a method performed by a controller for controlling a work machine including a work implement and comprises following processes. A first process is to acquire a size of a recess included in an actual topography within a work range. A second process is to determine whether the size of the recess is larger than a predetermined recess threshold. A third process is to determine a first area and a second area divided at a position of the recess within the work range when the recess is larger than the predetermined recess threshold. A fourth process is to determine a first target design topography indicative of a target trajectory of the work implement for the first area. A fifth process is to generate a command signal for operating the work implement according to the first target design topography.

A third aspect is a work machine and comprises a work implement and a controller. The controller is programmed to perform the following processing. The controller acquires a size of a recess included in an actual topography within a work range. The controller determines whether the size of the recess is larger than a predetermined recess threshold. When the recess is larger than the predetermined recess threshold, the controller determines a first area and a second area divided at a position of the recess in the work range. The controller determines a first target design topography indicative of a target trajectory of the work implement for the first area. The controller generates a command signal for operating the work implement according to the first target design topography.

Advantageous Effects of Invention

According to the present invention, when there is a recess larger than the predetermined recess threshold within the work range, the first area and the second area divided at the position of the recess are determined. Then, the work implement is operated according to the first target design topography determined for the first area. As a result, when excavating on the uneven topography, the number of times that the work machine gets over the unevenness can be reduced. Thereby, a reduction in work efficiency can be suppressed.

DESCRIPTION OF EMBODIMENTS

Figure 1:
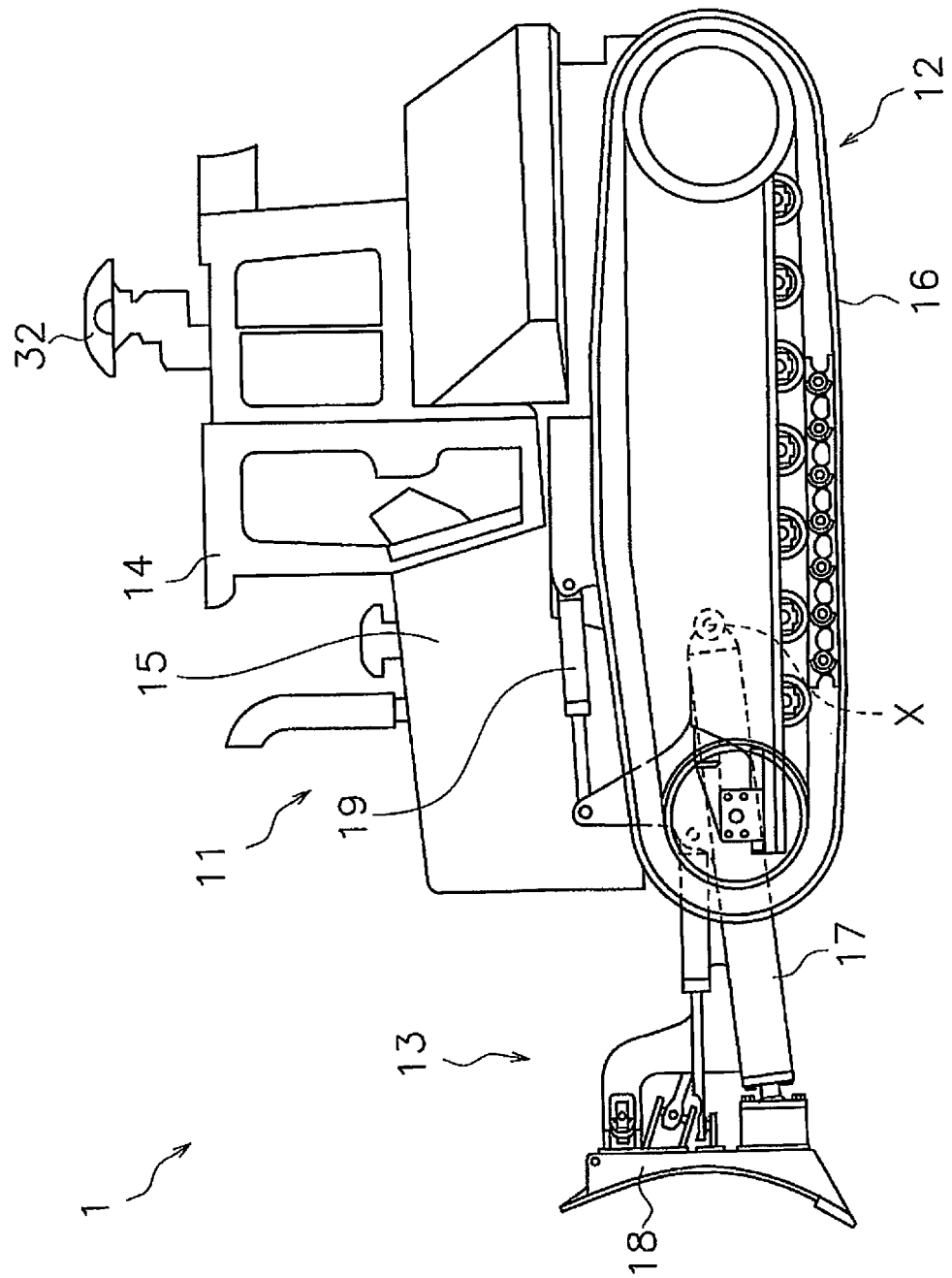
FIG. 1 is a side view showing a work machine according to an embodiment.

Hereinafter, a work machine according to an embodiment will be described with reference to the drawings. FIG. 1 is a side view showing a work machine 1 according to the embodiment. The work machine 1 according to the present embodiment is a bulldozer. The work machine 1 includes a vehicle body 11, a traveling device 12, and a work implement 13.

The vehicle body 11 includes a cab 14 and an engine compartment 15. A driver's seat (not illustrated) is arranged in the cab 14. The engine compartment 15 is disposed in front of the cab 14. The traveling device 12 is attached to a lower part of the vehicle body 11. The traveling device 12 includes a pair of left and right crawler belts 16. In FIG. 1, only the left crawler belt 16 is illustrated. As the crawler belts 16 rotate, the work machine 1 travels.

The work implement 13 is attached to the vehicle body 11. The work implement 13 includes a lift frame 17, a blade 18, and a lift cylinder 19.

The lift frame 17 is attached to the vehicle body 11 so as to be movable up and down around an axis X extending in the vehicle width direction. The lift frame 17 supports the blade 18. The blade 18 is disposed in front of the vehicle body 11. The blade 18 moves up and down as the lift frame 17 moves up and down. The lift frame 17 may be attached to the traveling device 12.

The lift cylinder 19 is connected to the vehicle body 11 and the lift frame 17. As the lift cylinder 19 expands and contracts, the lift frame 17 rotates up and down around the axis X.

Figure 2:
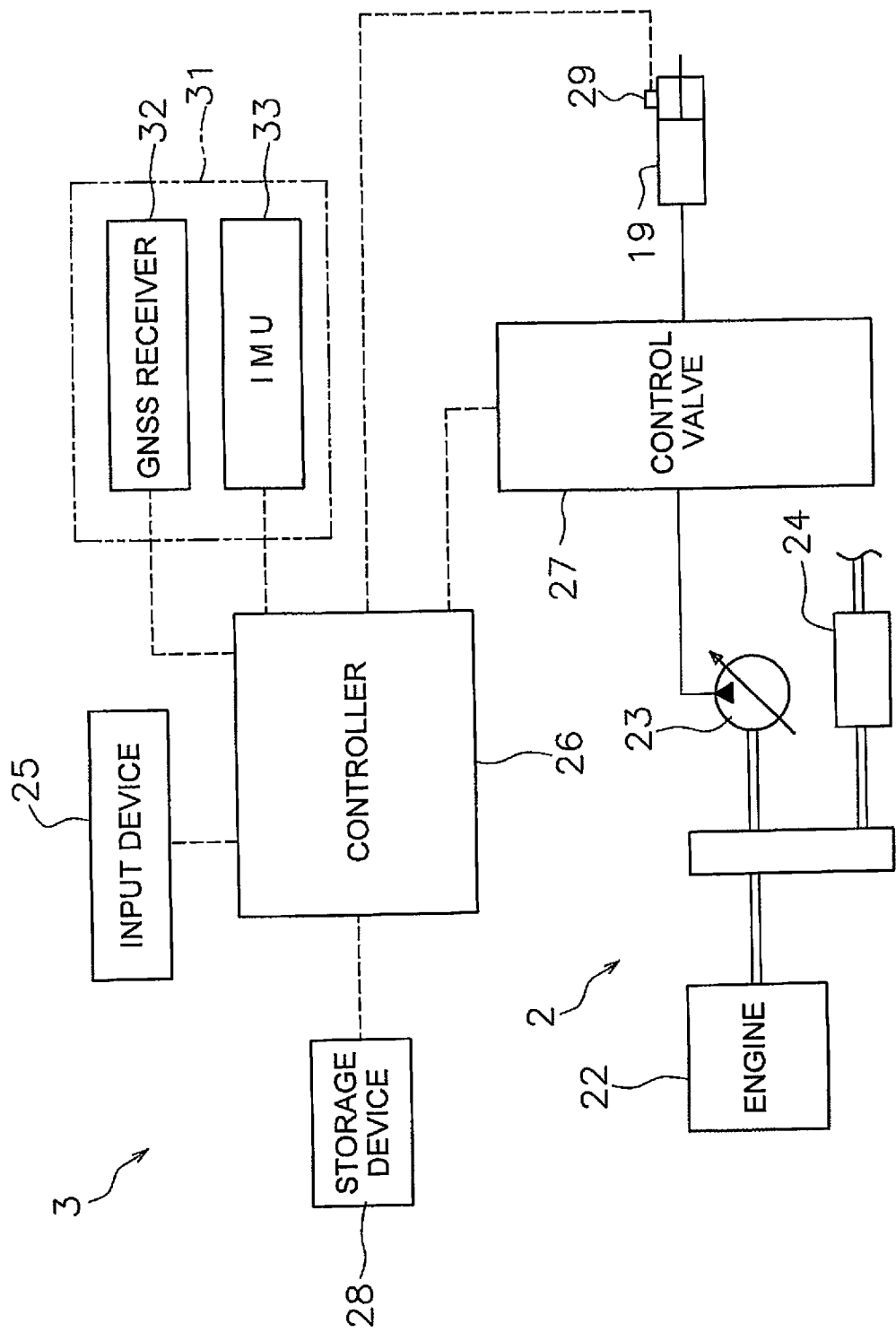
FIG. 2 is a block diagram showing a configuration of a drive system and a control system of the work machine.

FIG. 2 is a block diagram showing a configuration of a drive system 2 and a control system 3 for the work machine 1. As illustrated in FIG. 2, the drive system 2 includes an engine 22, a hydraulic pump 23, and a power transmission device 24.

The hydraulic pump 23 is driven by the engine 22 and discharges hydraulic fluid. The hydraulic fluid discharged from the hydraulic pump 23 is supplied to the lift cylinder 19. In FIG. 2, one hydraulic pump 23 is illustrated, but a plurality of hydraulic pumps may be provided.

The power transmission device 24 transmits the driving force of the engine 22 to the traveling device 12. The power transmission device 24 may be, for example, an HST (Hydro Static Transmission). Alternatively, the power transmission device 24 may be, for example, a torque converter or a transmission including a plurality of transmission gears.

The control system 3 includes an input device 25, a controller 26, a storage device 28, and a control valve 27. The input device 25 is disposed in the cab 14. The input device 25 is a device for setting automatic control of the work machine 1 described later. The input device 25 receives an operation by an operator and outputs an operation signal corresponding to the operation. The operation signal of the input device 25 is output to the controller 26. The input device 25 includes, for example, a touch screen display. However, the input device 25 is not limited to a touch screen and may include a hardware key. The input device 25 may be disposed at a location (for example, a control center) away from the work machine 1. The operator may operate the work machine 1 from the input device 25 in the control center via wireless communication.

The controller 26 is programmed to control the work machine 1 based on the acquired data. The controller 26 includes a processor, such as a CPU. The controller 26 acquires the operation signal from the input device 25. The controller 26 is not limited to being integrated, and may be divided into a plurality of controllers. The controller 26 causes the work machine 1 to travel by controlling the traveling device 12 or the power transmission device 24. The controller 26 moves the blade 18 up and down by controlling the control valve 27.

The control valve 27 is a proportional control valve and is controlled by a command signal from the controller 26. The control valve 27 is disposed between the hydraulic actuator, such as the lift cylinder 19, and the hydraulic pump 23. The control valve 27 controls a flow rate of the hydraulic fluid supplied from the hydraulic pump 23 to the lift cylinder 19. The controller 26 generates a command signal to the control valve 27 so that the blade 18 operates. Thereby, the lift cylinder 19 is controlled. The control valve 27 may be a pressure proportional control valve. Alternatively, the control valve 27 may be an electromagnetic proportional control valve.

Figure 3:
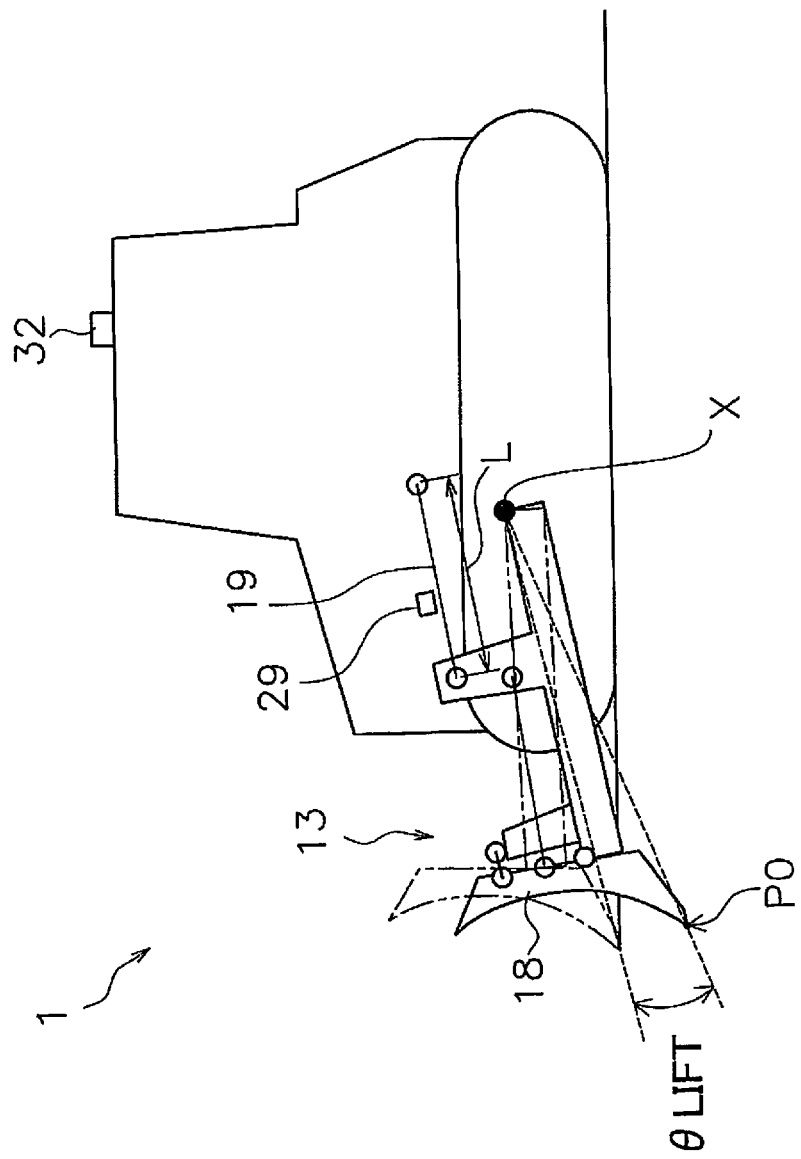
FIG. 3 is a schematic diagram showing a configuration of the work machine.

The control system 3 includes a work implement sensor 29. The work implement sensor 29 detects a position of the work implement and outputs a position signal indicative of the position of the work implement. The work implement sensor 29 may be a displacement sensor that detects a displacement of the work implement 13. Specifically, the work implement sensor 29 detects a stroke length of the lift cylinder 19 (hereinafter referred to as "lift cylinder length L"). As illustrated in FIG. 3, the controller 26 calculates a lift angle θlift of the blade 18 based on the lift cylinder length L. The work implement sensor 29 may be a rotation sensor that detects a rotation angle of the work implement 13. FIG. 3 is a schematic diagram showing the configuration of the work machine 1.

In FIG. 3, a reference position of the work implement 13 is indicated by a two-dot chain line. The reference position of the work implement 13 is a position of the blade 18 in a state where the blade tip of the blade 18 is in contact with the horizontal ground. The lift angle θlift is an angle from the reference position of the work implement 13.

As illustrated in FIG. 2, the control system 3 includes a position sensor 31. The position sensor 31 measures a position of the work machine 1. The position sensor 31 includes a GNSS (Global Navigation Satellite System) receiver 32 and an IMU (Inertial Measurement Unit) 33. The GNSS receiver 32 is a receiver for GPS (Global Positioning System), for example. For example, an antenna of the GNSS receiver 32 is disposed on the cab 14. The GNSS receiver 32 receives a positioning signal from a satellite, calculates the antenna position based on the positioning signal, and generates vehicle body position data. The controller 26 acquires the vehicle body position data from the GNSS receiver 32. The controller 26 acquires a traveling direction and a vehicle speed of the work machine 1 from the vehicle body position data. The vehicle body position data may not be a data of the antenna position. The vehicle body position data may be data indicative of a position whose positional relationship with the antenna is fixed within the work machine 1 or, in the vicinity of the work machine 1.

The IMU 33 is an inertial measurement unit. The IMU 33 acquires vehicle body inclination angle data. The vehicle body inclination angle data includes an angle (pitch angle) of a longitudinal direction of the work machine with respect to the horizontal and an angle (roll angle) of a transverse direction of the work machine 1 with respect to the horizontal. The controller 26 acquires the vehicle body inclination angle data from the IMU 33.

The controller 26 calculates a blade tip position P0 from the lift cylinder length L, the vehicle body position data, and the vehicle body inclination angle data. As illustrated in FIG. 3, the controller 26 calculates a global coordinate of the GNSS receiver 32 based on the vehicle body position data. The controller 26 calculates the lift angle θlift based on the lift cylinder length L. The controller 26 calculates a local coordinate of the blade tip position P0 with respect to the GNSS receiver 32 based on the lift angle θlift and vehicle body dimension data. The vehicle body dimension data is stored in the storage device 28, and indicates a position of the work implement 13 with respect to the GNSS receiver 32. The controller 26 calculates the global coordinate of the blade tip position P0 based on the global coordinate of the GNSS receiver 32, the local coordinate of the blade tip position P0, and the vehicle body inclination angle data. The controller 26 acquires the global coordinate of the blade tip position P0 as blade tip position data.

The storage device 28 includes, for example, a memory and an auxiliary storage device. The storage device 28 may be a RAM or a ROM, for example. The storage device 28 may be a semiconductor memory or a hard disk. The storage device 28 is an example of a non-transitory computer-readable recording medium. The storage device 28 is executable by the processor and records computer instructions for controlling the work machine 1.

The storage device 28 stores design topography data and work site topography data. The design topography data indicates a final design topography. The final design topography is a final target shape of a surface of the worksite. The design topography data is, for example, a construction drawing in a three-dimensional data format. The work site topography data indicates a wide area topography of the work site. The work site topography data is, for example, a current topographic survey map in a three-dimensional data format. The work site topography data can be acquired by, for example, an aerial laser survey.

The controller 26 acquires actual topography data. The actual topography data indicates an actual topography of the work site. The actual topography of the work site is a topography of an area along a traveling direction of the work machine 1. The actual topography data is acquired by calculation in the controller 26 from the work site topography data and the position and the traveling direction of the work machine 1 acquired from the position sensor 31 described above.

The controller 26 automatically controls the work implement 13 based on the actual topography data, the design topography data, and the blade tip position data. Note that the automatic control of the work implement 13 may be a semi-automatic control performed in combination with manual operation by an operator. Alternatively, the automatic control of the work implement 13 may be a fully automatic control that is performed without manual operation by an operator. The travel of the work machine 1 may be automatically controlled by the controller. For example, the travel control of the work machine 1 may be fully automatic control that is performed without manual operation by an operator. Alternatively, the travel control may be semi-automatic control performed in combination with manual operation by an operator. Alternatively, traveling of the work machine 1 may be performed manually by an operator.

Figure 4:
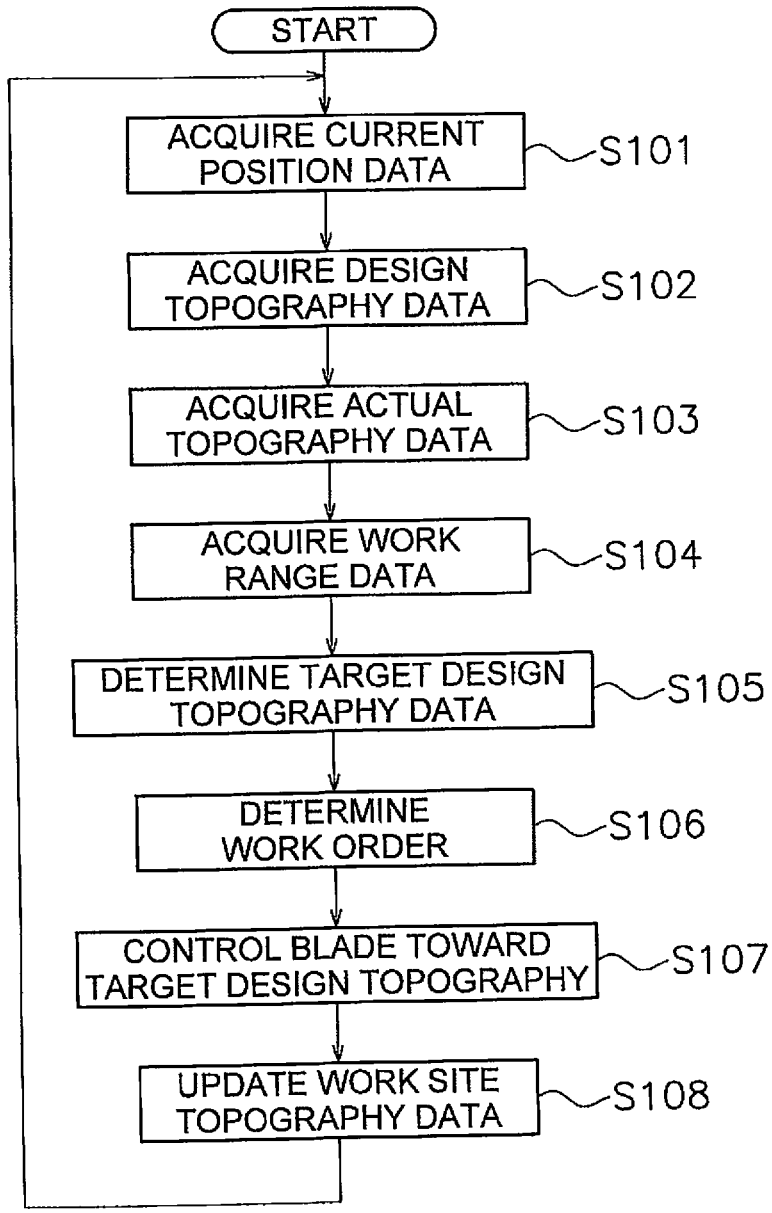
FIG. 4 is a flowchart showing automatic control processing of the work machine.

Hereinafter, automatic control of the work machine 1 in excavation executed by the controller 26 will be described. FIG. 4 is a flowchart showing automatic control processing.

As illustrated in FIG. 4, in step S101, the controller 26 acquires the current position data. Here, the controller 26 acquires the current blade tip position P0 of the blade 18 as described above.

Figure 5:
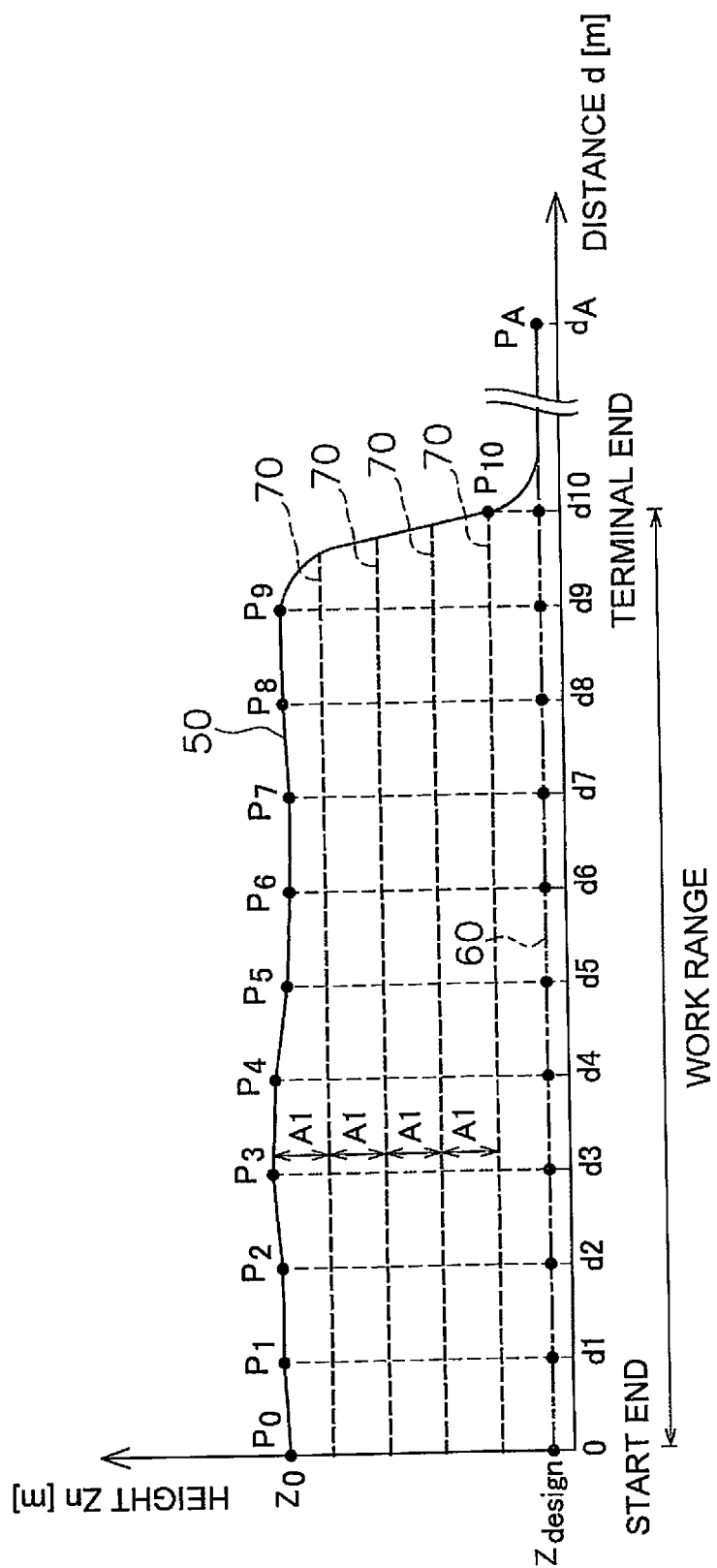
FIG. 5 is a diagram illustrating an example of a final design topography, an actual topography, and a target design topography.

In step S102, the controller 26 acquires the design topography data. As illustrated in FIG. 5, the design topography data includes the height Zdesign of the final design topography 60 at a plurality of reference points Pn (n=0, 1, 2, 3, . . . , A) in the traveling direction of the work machine 1. The plurality of reference points Pn indicate a plurality of points at predetermined intervals along the traveling direction of the work machine 1. The plurality of reference points Pn are on the traveling path of the blade 18. In FIG. 5, the final design topography 60 has a flat shape parallel to the horizontal direction, but may have a different shape.

In step S103, the controller 26 acquires the actual topography data. The controller 26 acquires the actual topography data by calculation from the work site topography data acquired from the storage device 28 and the vehicle body position data and the data of the traveling direction acquired from the position sensor 31.

The actual topography data is information indicative of the topography located in the traveling direction of the work machine 1. FIG. 5 shows a cross section of the actual topography 50. In FIG. 5, the vertical axis indicates the height of the topography, and the horizontal axis indicates the distance from the current position in the traveling direction of the work machine 1.

Specifically, the actual topography data includes the height Zn of the actual topography 50 at a plurality of reference points Pn from the current position to a predetermined topography recognition distance dA in the traveling direction of the work machine 1. In the present embodiment, the current position is a position determined based on the current blade tip position P0 of the work machine 1. However, the current position may be determined based on the current position of the other part of the work machine 1. The plurality of reference points are arranged at a predetermined interval, for example, every 1 m.

In step S104, the controller 26 acquires work range data. The work range data indicates a work range set by the input device 25. The work range includes a start end and a terminal end. The work range data includes a coordinate of the start end and a coordinate of the terminal end. Alternatively, the work range data may include the coordinate of the start end and a length of the work range. Alternatively, the work range data may include the coordinate of the terminal end and the length of the work range.

The controller 26 acquires the work range data based on the operation signal from the input device 25. However, the controller 26 may acquire the work range data by other methods. For example, the controller 26 may acquire the work range data from an external computer that performs construction management at the work site. The external computer may be arranged in the control center.

In step S105, the controller 26 determines target design topography data. The target design topography data indicates a target design topography 70 indicated by a broken line in FIG. 5. The target design topography 70 indicates a desired trajectory of the blade tip of the blade 18 in the work. The target design topography 70 is a target profile of the topography to be worked, and indicates a desired shape as a result of excavation work. The target profile indicates a target line on a plane located below the ground surface for controlling the blade tip of the work implement 13 to move along the target line.

As illustrated in FIG. 5, the controller 26 determines a target design topography 70 at least partially located below the actual topography 50. For example, the controller 26 determines the target design topography 70 that extends in the horizontal direction. The controller 26 generates a plurality of the target design topographies 70 displaced from each other by a predetermined distance A1 in the vertical direction. The predetermined distance A1 may be set based on an operation signal from the input device 25. The predetermined distance A1 may be acquired from an external computer that performs construction management at the work site. Alternatively, the predetermined distance A1 may be a fixed value.

The controller 26 determines the target design topographies 70 so as not to go below the final design topography 60. Therefore, the controller 26 determines the target design topographies 70 that is located on or above the final design topography 60 and below the actual topography 50 during excavation work.

Figure 6:
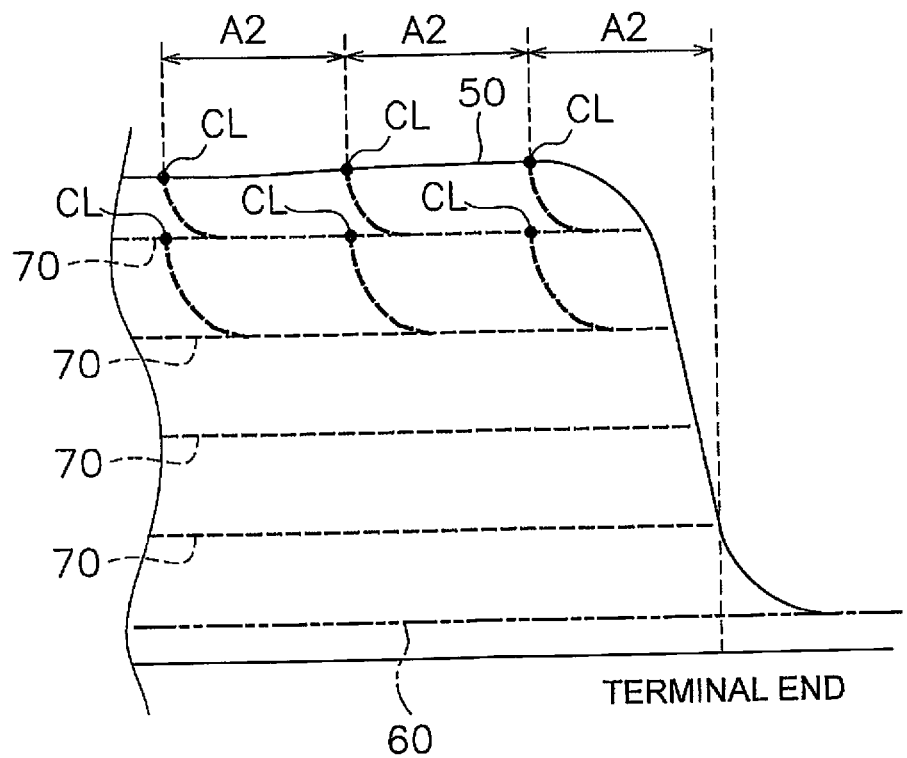
FIG. 6 is a diagram illustrating an example of a cut location in each target design topography.

In step S106, the controller 26 determines work order. The controller 26 determines the work order so as to perform excavation in order from the top of the plurality of target design topographies 70. Further, as illustrated in FIG. 6, the controller 26 determines the cut locations CL and the work order within the work range in each target design topography 70. The cut locations CL are positions on the actual topography 50 where excavation is started.

The controller 26 may determine a position away from the terminal end by a predetermined distance A2 as the cut location CL. The controller 26 may determine a position separated by a predetermined distance A2 from the previous cut location CL as the next cut location CL. The predetermined distance A2 may be a fixed value. Alternatively, the predetermined distance A2 may be set by an operator via the input device 25. The controller 26 may determine the cut location CL according to the machine capability of the work machine 1 or the amount of soil to be excavated. The controller 26 determines the work order so that excavation is performed in order from the closest one to the terminal end among the plurality of cut locations CL.

In step S107, the controller 26 controls the blade 18 toward the target design topography 70. The controller 26 generates a command signal to the work implement 13 so that the blade tip position of the blade 18 moves from the cut location CL determined in step S106 toward the target design topography 70 generated in step S105. The generated command signal is input to the control valve 27. As a result, the blade tip position P0 of the work implement 13 moves from the cut location CL toward the target design topography 70.

When excavation from one cut location CL is completed, the controller 26 moves the work machine 1 to the next cut location CL, and excavates again. By repeating these operations, excavation of one target design topography 70 is completed within the work range. When the excavation of one target design topography 70 is completed within the work range, the controller 26 starts excavation of the next target design topography 70. By repeating such processing, excavation is performed so that the actual topography 50 approaches the final design topography 60.

In step S108, the controller 26 updates the work site topography data. The controller 26 updates the work site topography data with position data indicative of the latest trajectory of the blade tip position P0. Alternatively, the controller 26 may calculate the position of the bottom surface of the crawler belt 16 from the vehicle body position data and the vehicle body dimension data, and update the work site topography data with the position data indicative of the trajectory of the bottom surface of the crawler belt 16. In this case, the work site topography data can be updated immediately.

Alternatively, the work site topography data may be generated from survey data measured by a surveying device external to the work machine 1. As an external surveying device, for example, an aviation laser surveying may be used. Alternatively, the actual topography 50 may be captured by a camera, and the work site topography data may be generated from image data acquired by the camera. For example, aerial surveying by UAV (Unmanned Aerial vehicle) may be used. In the case of the external surveying device or the camera, the work site topography data may be updated every predetermined period or at any time.

Figure 7:
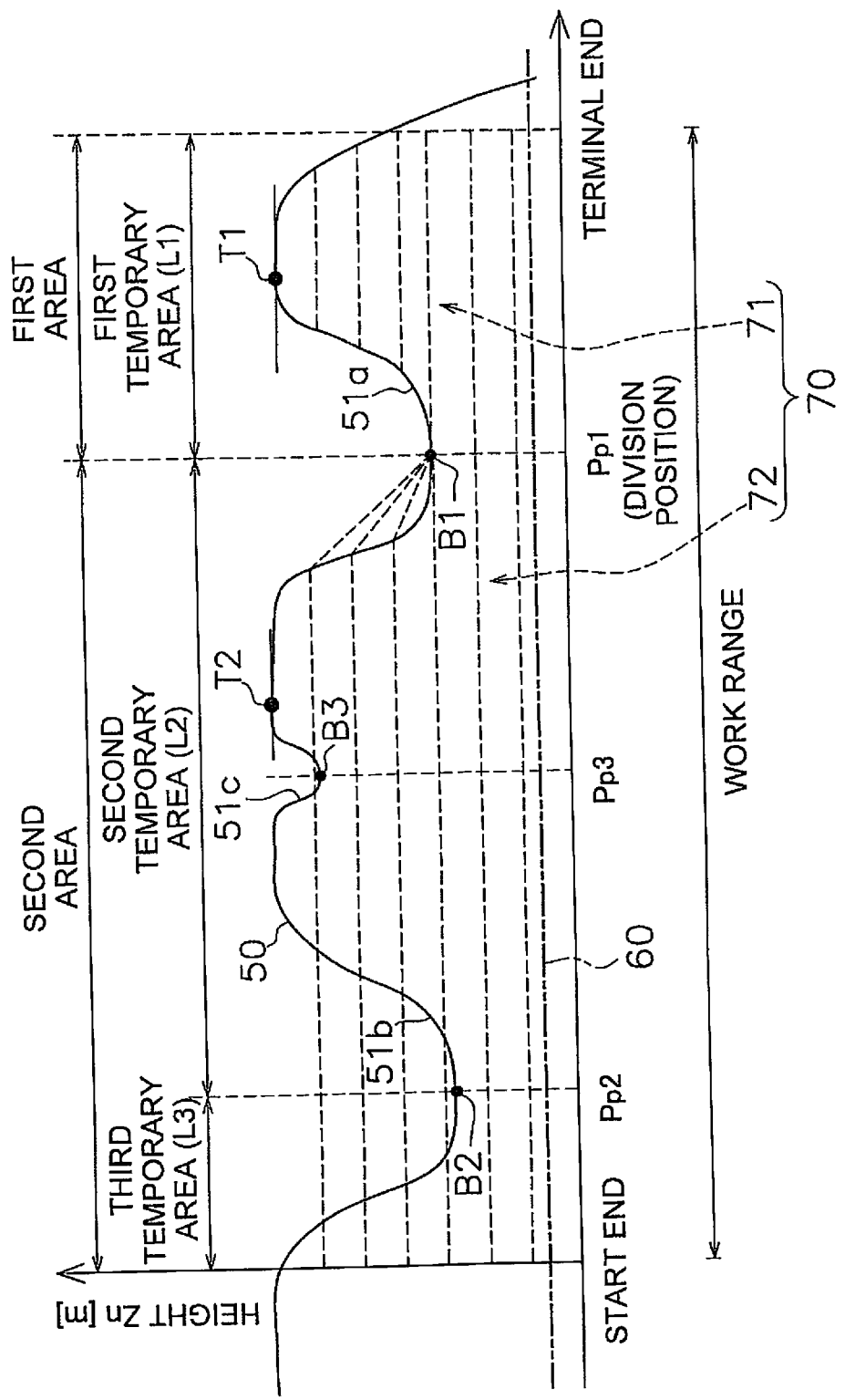
FIG. 7 is a diagram illustrating an example of the target design topography when the actual topography has large unevenness.
Figure 8:
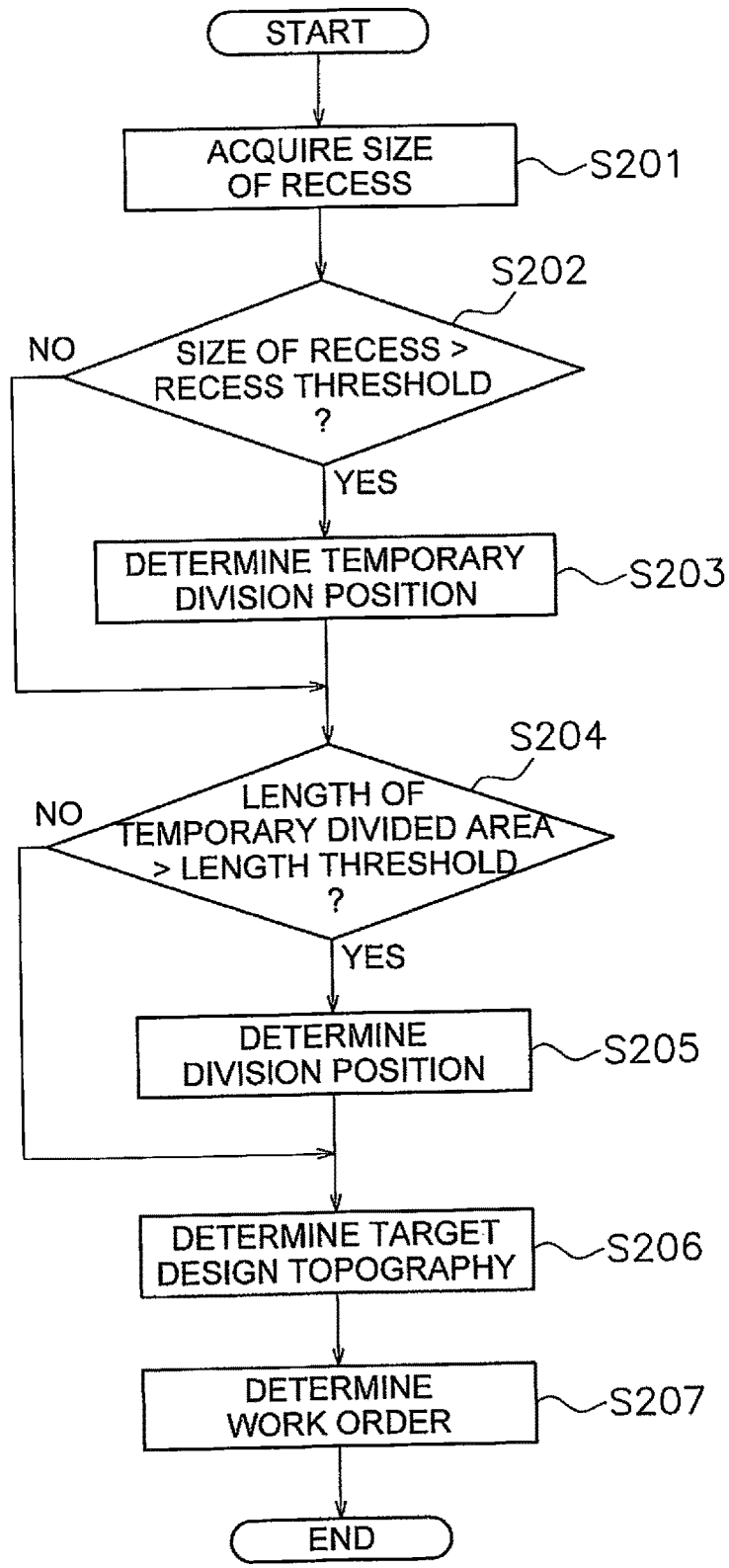
FIG. 8 is a flowchart showing a process of automatic control of the work machine.

Next, as illustrated in FIG. 7, a method for determining the target design topography 70 when the actual topography 50 has large unevenness will be described. FIG. 8 is a flowchart showing the process of determining the target design topography 70. As illustrated in FIG. 8, in step S201, the controller 26 acquires a size of a recess included in the actual topography 50 within the work range. The controller 26 acquires the size of the recess included in the actual topography 50 within the work range from the actual topography data. When the actual topography 50 in the work range includes a plurality of recesses, the controller 26 acquires the sizes of the plurality of recesses.

Figure 9:
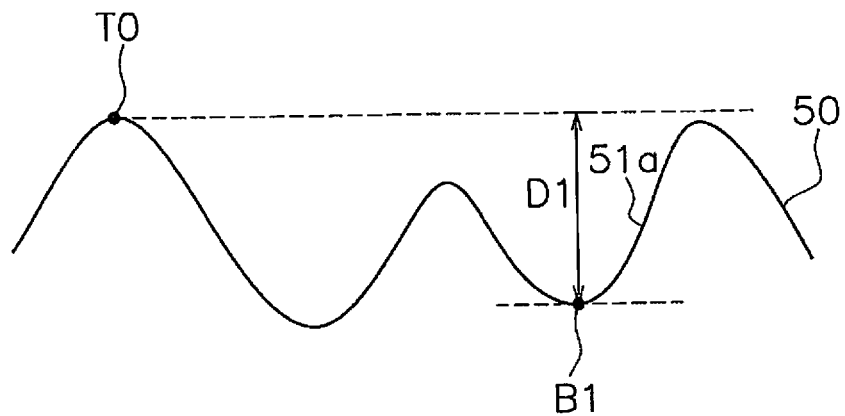
FIG. 9 is a diagram showing a first example of a definition of a depth of a recess.

The size of the recess is a depth of the recess. For example, as illustrated in FIG. 9, the depth of the recess 51a is a depth of the bottom B1 of the recess 51a from the highest point T0 of the actual topography 50 within the work range. Specifically, the depth of the recess 51a is a distance D1 from the highest point T0 of the actual topography 50 within the work range to the bottom B1 of the recess 51a in the direction of gravity. The bottom B1 of the recess 51a is the lowest point in the direction of gravity. However, the definition of the depth of the recess may be different from the above.

In step S202, the controller 26 determines whether the size of the recess is larger than a predetermined recess threshold. That is, the controller 26 determines whether the depth of the recess is greater than the predetermined recess threshold. The predetermined recess threshold is set to a value considering work efficiency. For example, when the target design topography 70 is generated as illustrated in FIG. 5, the predetermined recess threshold is set to a value indicative of the size of the recess so that the work machine 1 needs to get over the recess multiple times. When the size of the recess is larger than the predetermined recess threshold, the controller 26 determines the position of the recess as a temporary division position.

The controller 26 performs the processes of step S202 and step S203 for all the recesses in the work range. Thereby, the position of the recess larger than the predetermined recess threshold among the recesses in the work range is determined as the temporary division position. For example, in the example illustrated in FIG. 7, the actual topography 50 in the work range includes a first recess 51a, a second recess 51b, and a third recess 51c. The depths of the first recess 51a and the second recess 51b are larger than the recess threshold. Therefore, the controller 26 determines the position Pp1 of the first recess 51a and the position Pp2 of the second recess 51b as the temporary division positions. However, the depth of the third recess 51c is not more than the recess threshold. For this reason, the controller 26 does not determine the position Pp3 of the third recess 51c as the temporary division position.

The position of each recess 51a-51c means the position of a vertical line passing through the bottom B1-B3 of each recess 51a-51c. However, the positions of the recesses 51a-51c may be other positions. For example, the position of the recesses 51a-51c may be the positions of the inflection point of the recesses 51a-51c. Or the position of each recess 51a-51c may be the position of the other part contained in each recess 51a-51c.

In step S204, the controller 26 determines whether a length of a temporary divided area is larger than a predetermined length threshold. The temporary divided area is an area between the terminal end and the temporary division position that is closest to the terminal end, an area between the start end and the temporary division position that is closest to the start end, and an area between the temporary division positions adjacent to each other. For example, in the example illustrated in FIG. 7, the controller 26 determines the first temporary area, the second temporary area, and the third temporary area as temporary divided areas.

The first temporary area is an area between the terminal end and the position Pp1 of the first recess 51a. The second temporary area is an area between the position Pp1 of the first recess 51a and the position Pp2 of the second recess 51b. The third temporary area is an area between the position Pp2 of the second recess 51b and the start end. The length of the temporary divided area is a horizontal distance between the temporary division positions. The length threshold is set to a value that takes into account work efficiency, for example. When the length of the temporary divided area is larger than the predetermined length threshold, the process proceeds to step S205.

In step S205, the controller 26 determines a division position. The controller 26 determines the temporary division position of the temporary divided area having a length larger than the length threshold as the division position. In other words, the controller 26 does not determine the temporary division position of the temporary divided area having a length equal to or less than the length threshold as the division position.

The controller 26 performs the processes of step S204 and step S205 for all temporary divided areas within the work range. Thereby, among the temporary division positions in the work range, the temporary division position that partitions the temporary divided area having a length larger than the length threshold is determined as the division position.

For example, in the example illustrated in FIG. 7, the length L1 of the first temporary area and the length L2 of the second temporary area are larger than the length threshold. However, the length L3 of the third temporary area is equal to or less than the length threshold. Therefore, the controller 26 does not determine the position Pp2 of the second recess 51b as the division position, but determines the position Pp1 of the first recess 51a as the division position. Therefore, the controller 26 divides the work range into the first area and the second area at the position Pp1 of the first recess 51a. Specifically, the first area is an area between the terminal end and the position Pp1 of the first recess 51a. The second area is an area between the start end and the position Pp1 of the first recess 51a.

Figure 10:
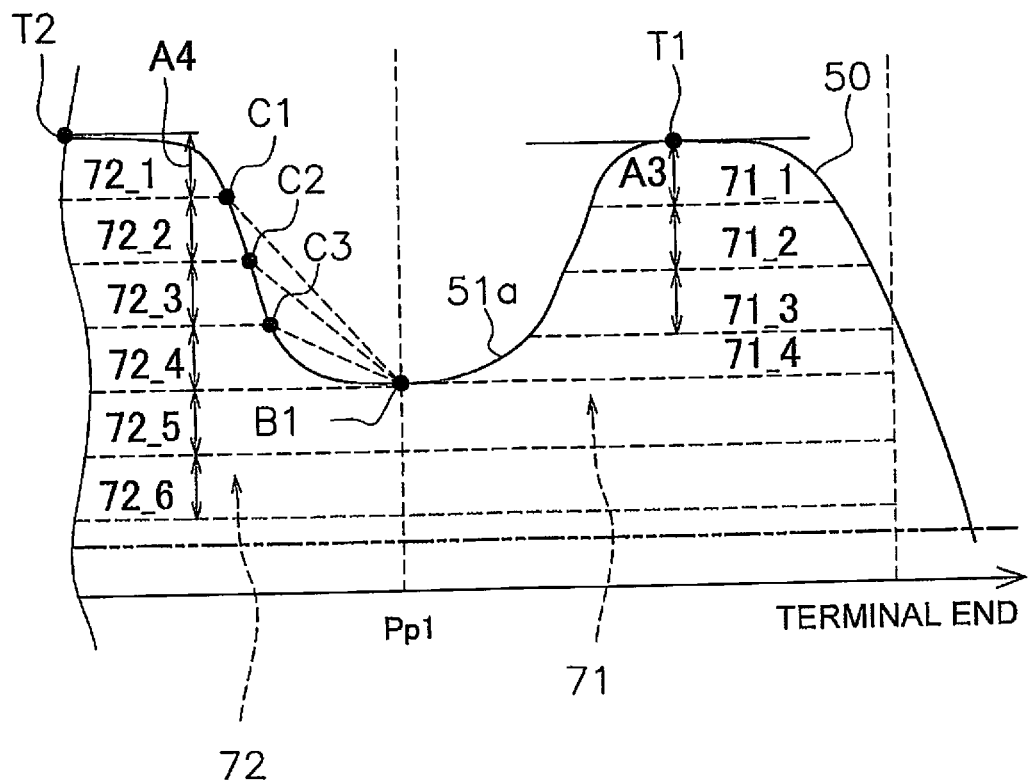
FIG. 10 is a diagram illustrating an example of a first target design topography and a second target design topography.

In step S206, the controller 26 determines the target design topography 70 for each divided area. The controller 26 determines the target design topography 70 in order from the area closer to the terminal end among the divided areas. In the example illustrated in FIG. 7, the controller 26 determines the first target design topography 71 for the first area and the second target design topography 72 for the second area. FIG. 10 is a diagram illustrating an example of the first target design topography 71 and the second target design topography 72.

As illustrated in FIG. 10, the first target design topography 71 includes a plurality of first target design surfaces 71_1-71_4. The plurality of first target design surfaces 71_1-71_4 are displaced from each other by a predetermined distance A3 in the vertical direction. The controller 26 may determine the predetermined distance A3 of the first target design surfaces 71_1-71_4 in the same manner as the predetermined distance A1 in step S105 described above. Alternatively, the predetermined distance A3 of the first target design surfaces 71_1-71_4 may be different from the predetermined distance A1 in step S105.

The plurality of the first target design surfaces 71_1-71_4 extend in the horizontal direction. For example, the controller 26 determines the plurality of the first target design surfaces 71_1-71_4 downwardly apart from each other by the predetermined distance A3 from the vertex T1 of the actual topography 50 in the first area. The controller 26 sets the target design surface 71_4 passing through the bottom B1 of the first recess 51a as the lowest first target design surface.

Next, the controller 26 determines a plurality of second target design surfaces 72_1-72_6 downwardly apart from each other by a predetermined distance A4 from the vertex T2 of the actual topography 50 in the second area. The predetermined distance A4 may be the same as the predetermined distance A3. Alternatively, the predetermined distance A4 may be different from the predetermined distance A3. The second target design surfaces 72_1-72_6 extend into the first area beyond the division position Pp1 at a position below the lowermost first target design surface 71_4.

As in the example illustrated in FIG. 7, when there is no other divided area on the start end side from the second area, the controller 26 generates the second target design surfaces 72_1-72_3 to a position not exceeding below the final design topography 60-72_6. In addition, the controller 26 generates the second target design surfaces 72_1-72_3 so as to connect the lowermost first target design surface 71_4 and a node between the second target design surfaces 72_1-72_3 and the actual topography 50.

In step S207, the controller 26 determines the work order. The controller 26 determines the work order to operate the work implement 13 according to the first target design topography 71 before operating the work implement 13 according to the second target design topography 72. That is, the controller 26 operates the work implement 13 in accordance with the second target design topography 72 after operating the work implement 13 in accordance with the first target design topography 71.

In the first target design topography 71, the controller 26 determines the work order so that the work is performed in order from the top of the first target design surfaces 71_1-

71_4. In the second target design topography 72, the controller 26 determines the work order so that the work is performed in order from the top of the second target design surfaces 72_1-72_6. Note that the controller 26 determines the cut location CL and its work order on each target design surface 71_1-71_4, 72_1-72_6, as in step S106 described above.

As described above, the controller 26 determines the target design topography 70 and the work order when the actual topography 50 has large unevenness. Other processes are the same as those illustrated in FIG. 4.

In the example illustrated in FIG. 7, the controller 26 determines the first area and the second area divided at the position Pp1 of the first recess 51a. Then, the controller 26 operates the work implement 3 according to the first target design topography 71 determined for the first area. Specifically, the controller 26 first operates the blade 18 in accordance with the uppermost first target design surface 71_1. When the excavation of the first target design surface 71_1 is completed, the controller 26 operates the blade 18 in accordance with the first target design surface 71_2 which is one lower than the first target design surface 71_1. By repeating such an operation, the controller 26 excavates sequentially from the uppermost first target design surface 71_1 to the lowermost first target design surface 71_4. As a result, the raised topography of the first area is excavated.

Next, the controller 26 operates the blade 18 in accordance with the second target design topography 72 determined for the second area. Specifically, when the excavation of the lowermost first target design surface 71_4 is completed, the controller 26 operates the blade 18 according to the uppermost second target design surface 72_1. Then, the controller 26 sequentially excavates from the uppermost second target design surface 72_1 to the lowermost second target design surface 72_6. Thereafter, the controller 26 operates the blade 18 according to the final design topography 60. As a result, the actual topography 50 is excavated to the position of the final design topography 60.

As described above, in the control system 3 for the work machine 1 according to the present embodiment, when excavation is performed on a topography having a large recess, the work range is divided into a plurality of areas by the recess. Then, excavation is performed on one of the divided areas first, and then the remaining area is excavated. Therefore, it is possible to reduce the number of times that the work machine 1 gets over the unevenness. Thereby, a reduction in work efficiency can be suppressed.

Figure 11:
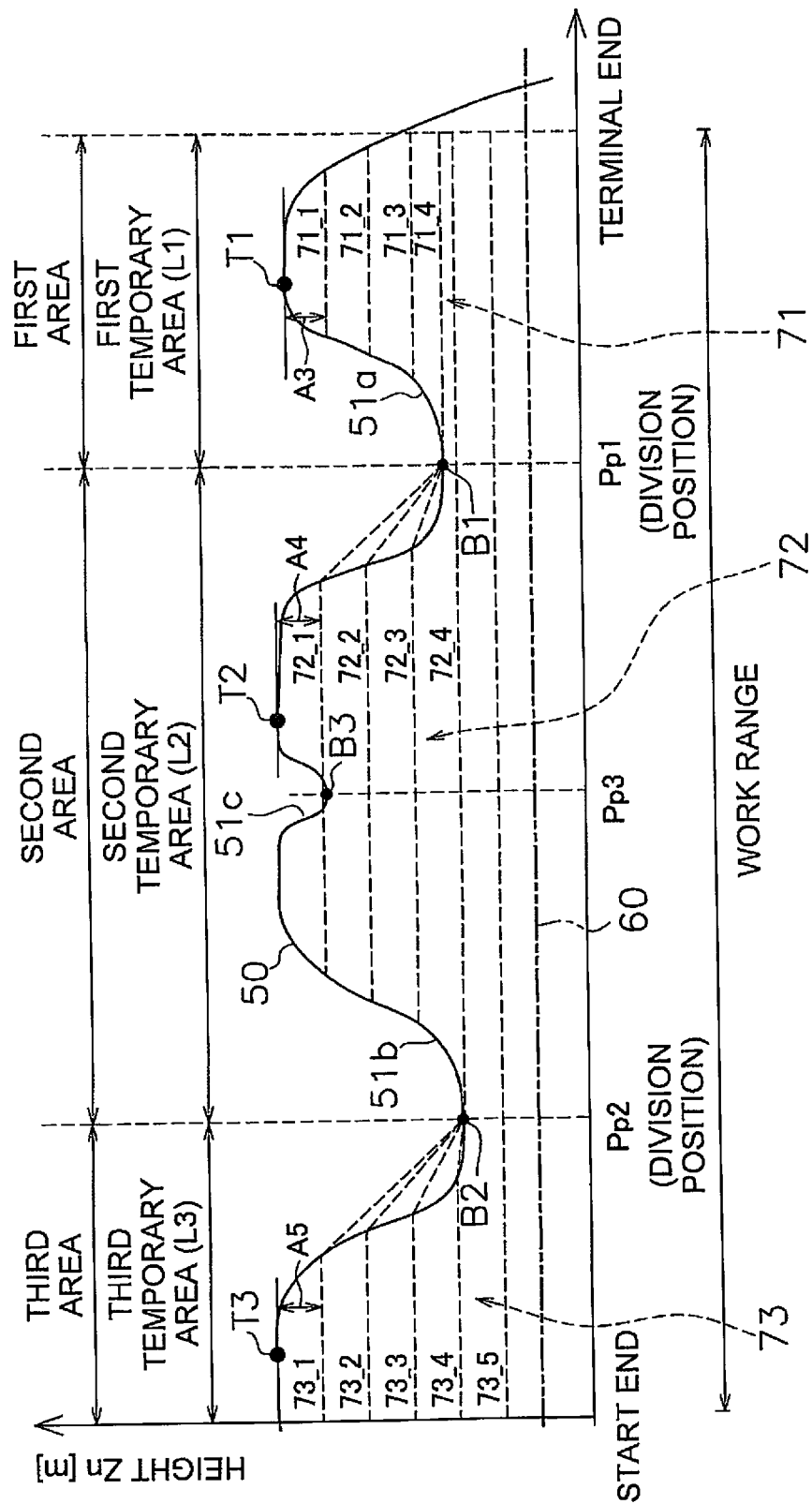
FIG. 11 is a diagram illustrating another example of the target design topography when the actual topography has large unevenness.

FIG. 11 is a diagram showing another example of the actual topography 50 with unevenness. In the example illustrated in FIG. 11, the length L1 of the first temporary area, the length L2 of the second temporary area, and the length L3 of the third temporary area are larger than the length threshold. Therefore, the controller 26 determines the position Pp1 of the first recess 51a and the position Pp2 of the second recess 51b as the division positions. Therefore, the controller 26 divides the work range into the first area, the second area, and the third area. The first area is an area between the terminal end and the position Pp1 of the first recess 51a. The second area is an area between the position Pp1 of the first recess 51a and the position Pp2 of the second recess 51b. The third area is an area between the start end and the position Pp2 of the second recess 51b.

The controller 26 determines the target design topography 70 for the first to third areas. The controller 26 determines the target design topography 70 in order from the area closer to the terminal end among the first to third areas. The first area is closer to the terminal end than the second area, and the second area is closer to the terminal end than the third area. Therefore, the controller 26 first determines the first target design topography 71 for the first area. Next, the controller 26 determines a second target design topography 72 for the second area. Next, the controller 26 determines a third target design topography 73 for the third area.

Similarly to the example illustrated in FIG. 7 described above, the controller 26 determines a plurality of first target design surfaces 71_1-71_4 downwardly apart from each other by the predetermined distance A3 from the vertex T1 of the actual topography 50 in the first area. The controller 26 sets the first target design surface 71_4 passing through the bottom B1 of the first recess 51a as the lowest first target design surface.

Next, the controller 26 determines a plurality of second target design surfaces 72_1-72_4 downwardly apart from each other by a predetermined distance A4 from the vertex T2 of the actual topography 50 in the second area. However, as in the example illustrated in FIG. 11, when there is another divided area (third area) on the start end side from the second area, the controller 26 determines the second target design surface 72_4 passing through the bottom B2 of the recess 51b located on the start end side in the second area as the lowermost second target design surface.

Next, the controller 26 determines a plurality of third target design surfaces 73_1-73_5 downwardly apart from each other by a predetermined distance A5 from the vertex T3 of the actual topography 50 in the third area. The predetermined distance A5, the predetermined distance A3, or the predetermined distance A4 may be same as each other. Alternatively, the predetermined distance A5 may be different from the predetermined distance A3 or the predetermined distance A4. The third target design surfaces 73_1-73_5 extend into the second area and the first area beyond the division position Pp2 at a position below the bottom B2 of the second recess 51b. In the example illustrated in FIG. 11, since there is no other divided area on the start end side from the third area, the controller 26 generates the third target design surfaces 73_1-73_5 to a position not exceeding below the final design topography 60.

As described above, in the example illustrated in FIG. 11, the controller 26 determines the first area, the second area, and the third area divided by the position Pp1 of the first recess 51a and the position Pp2 of the second recess 51b. Then, the controller 26 operates the work implement 3 according to the first target design topography 71 determined for the first area. Specifically, the controller 26 performs excavation in order from the uppermost first target design surface 71_1 to the lowermost first target design surface 71_4. As a result, the raised topography of the first area is excavated.

Next, the controller 26 operates the work implement 3 according to the second target design topography 72 determined for the second area. Specifically, when excavation of the lowermost first target design surface 71_4 in the first area is completed, the controller 26 operates the blade 18 according to the uppermost second target design surface 72_1 in the second area. Then, the controller 26 sequentially excavates from the uppermost second target design surface 72_1 to the lowermost second target design surface 72_4. Thereby, the raised topography of the second area is excavated.

Next, the controller 26 operates the work implement 3 according to the third target design topography 73 determined for the third area. Specifically, when excavation of the lowermost second target design surface 72_4 in the second area is completed, the controller 26 operates the blade 18 in accordance with the uppermost third target design surface 73_1 in the third area. Then, the controller 26 sequentially excavates from the uppermost third target design surface 73_1 to the lowermost third target design surface 73_5. Thereafter, the controller 26 operates the blade 18 according to the final design topography 60. As a result, the actual topography 50 is excavated to the position of the final design topography 60.

In the above description, the example in which the work range is divided into two or three areas has been described. However, even when the work range is divided into four or more areas, the same processing as described above is performed.

As mentioned above, although one embodiment of the present invention was described, this invention is not limited to the said embodiment, a various change is possible in the range which does not deviate from the scope of the invention.

The work machine 1 is not limited to a bulldozer, but may be another machine, such as a wheel loader, a motor grader, or a hydraulic excavator.

The work machine 1 may be a work machine that can be remotely controlled. In that case, a part of the control system 3 may be arranged outside the work machine 1. For example, the controller 26 may be disposed outside the work machine 1. The controller 26 may be located in a control center remote from the work site. In that case, the work machine 1 may be a vehicle that does not include the cab 14.

The work machine 1 may be a vehicle driven by an electric motor. In that case, the power source may be arranged outside the work machine 1. The work machine 1 to which power is supplied from the outside may be a vehicle that does not include the internal combustion engine 22 and the engine room.

Figure 12:
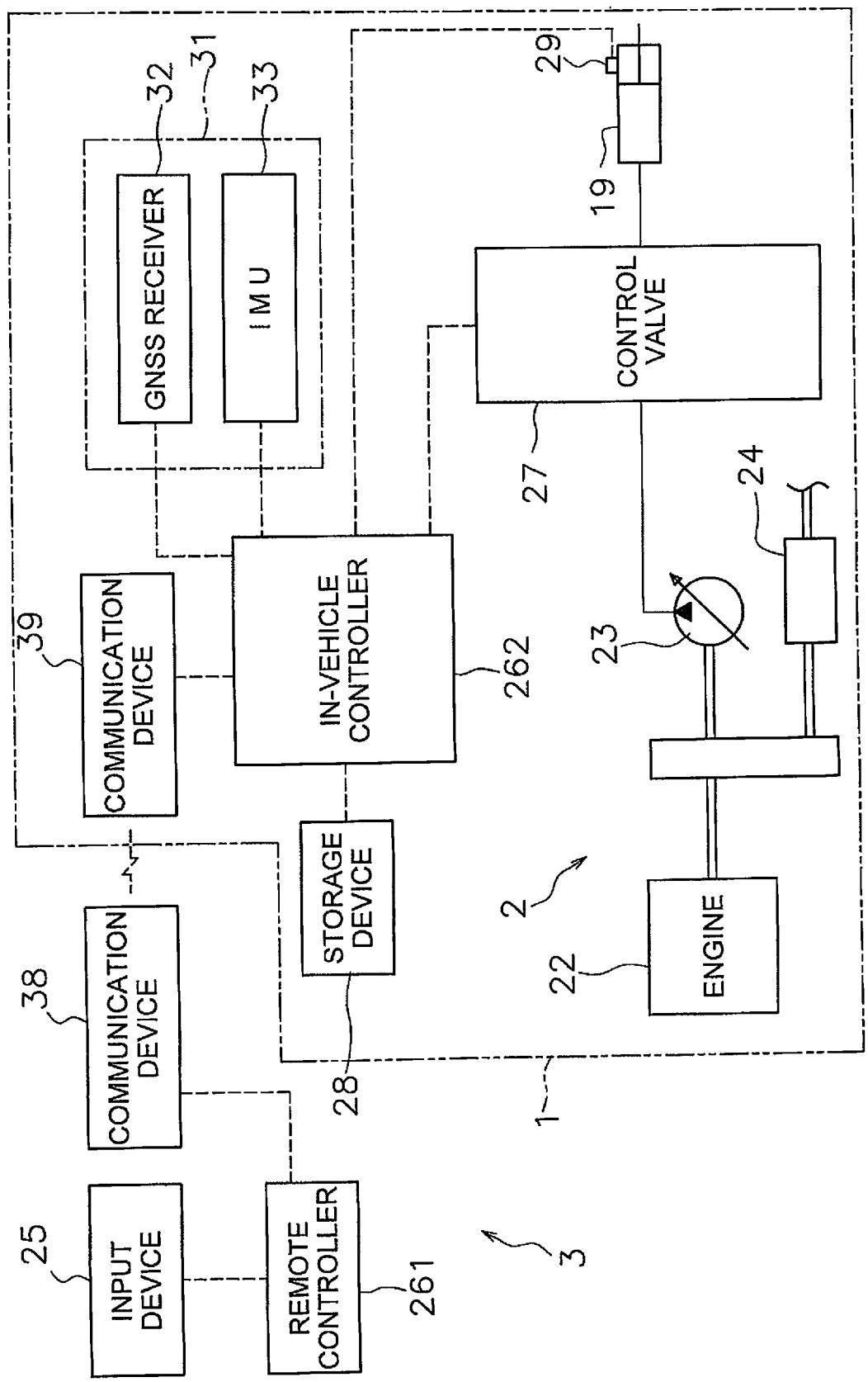
FIG. 12 is a block diagram showing a configuration according to a first modification of the control system.

The controller 26 may include a plurality of controllers 26 that are separate from each other. For example, as illustrated in FIG. 12, the controller 26 may include a remote controller 261 which is arranged outside the work machine 1 and an in-vehicle controller 262 mounted in work machine 1. The remote controller 261 and the in-vehicle controller 262 may be able to communicate wirelessly via the communication devices 38 and 39. A part of the functions of the controller 26 described above may be executed by the remote controller 261, and the remaining functions may be executed by the in-vehicle controller 262. For example, the process of determining the target design topography 70 may be executed by the remote controller 261, and the process of outputting a command signal to the work implement 13 may be executed by the in-vehicle controller 262.

The input device 25 may be arranged outside the work machine 1. In that case, the cab may be omitted from the work machine 1. The input device 25 may be omitted from the work machine 1. The input device 25 may include an operation element such as an operation lever, a pedal, or a switch for operating the traveling device 12 and/or the work implement 13. Depending on the operation of the input device 25, traveling, such as forward and reverse, of the work machine 1 may be controlled. Depending on the operation of the input device 25, operations, such as raising and lowering work implement 13, may be controlled.

Figure 13:
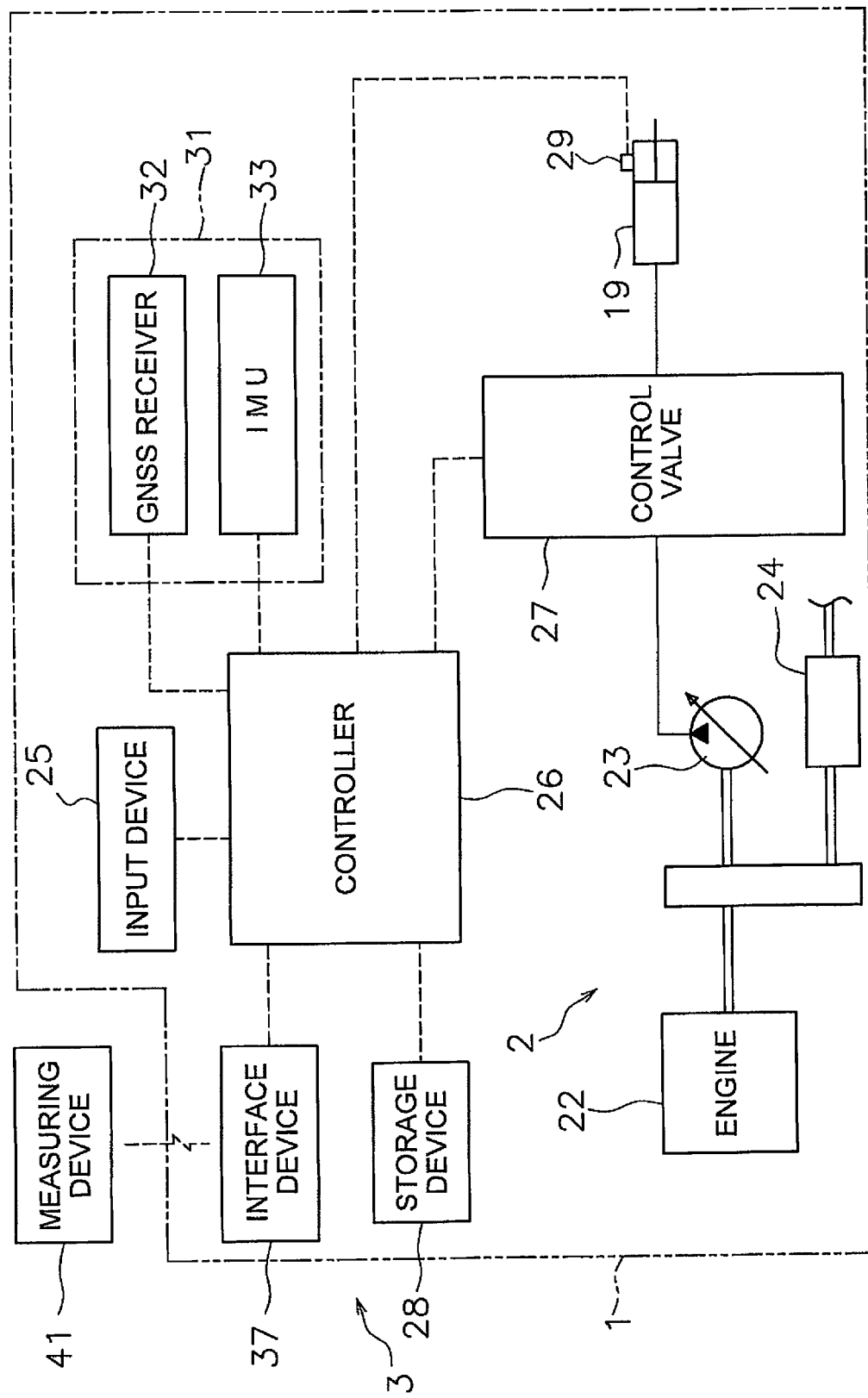
FIG. 13 is a block diagram showing a configuration according to a second modification of the control system.

The actual topography 50 may be acquired by another device not limited to the position sensor 31 described above. For example, as illustrated in FIG. 13, the actual topography 50 may be acquired by the interface device 37 that receives data from an external device. The interface device 37 may receive the actual topography 50 data measured by the external measuring device 41 by wireless communication. Alternatively, the interface device 37 may be a recording medium reading device and may receive the actual topography 50 data measured by the external measuring device 41 via the recording medium.

Figure 14:
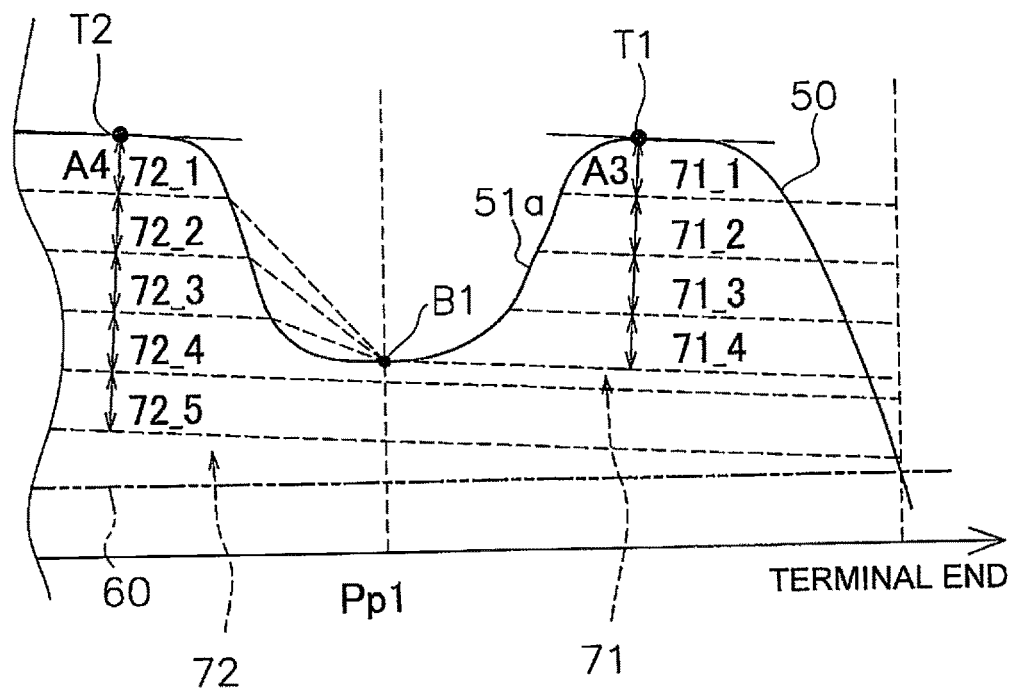
FIG. 14 is a diagram showing a first modification of the target design topography.

The method of determining the target design topography 70 is not limited to that of the above embodiment, and may be changed. For example, the target design topography 70 (the first target design topography 71, the second target design topography 72, and the third target design topography 73) is acquired by shifting the actual topography 50 by a predetermined distance in the vertical direction. Alternatively, as illustrated in FIG. 14, the target design topography 70 (the first target design topography 71, the second target design topography 72, the third target design topography 73) is inclined at a predetermined angle with respect to the horizontal direction. The predetermined angle may be set by an operator. Alternatively, the controller 26 may automatically determine the predetermined angle.

The method for determining the first target design topography 71, the second target design topography 72, and the third target design topography 73 is not limited to that of the above embodiment, and may be changed. For example, the controller 26 may first determine a first target design surface 71_4 that passes through the bottom B1 of the first recess 51a, and determine a plurality of first target designs upwardly apart from each other by the predetermined distance A3 from the first target design surface 71_4. The same applies to the second target design topography 72 and the third target design topography 73.

Figure 15:
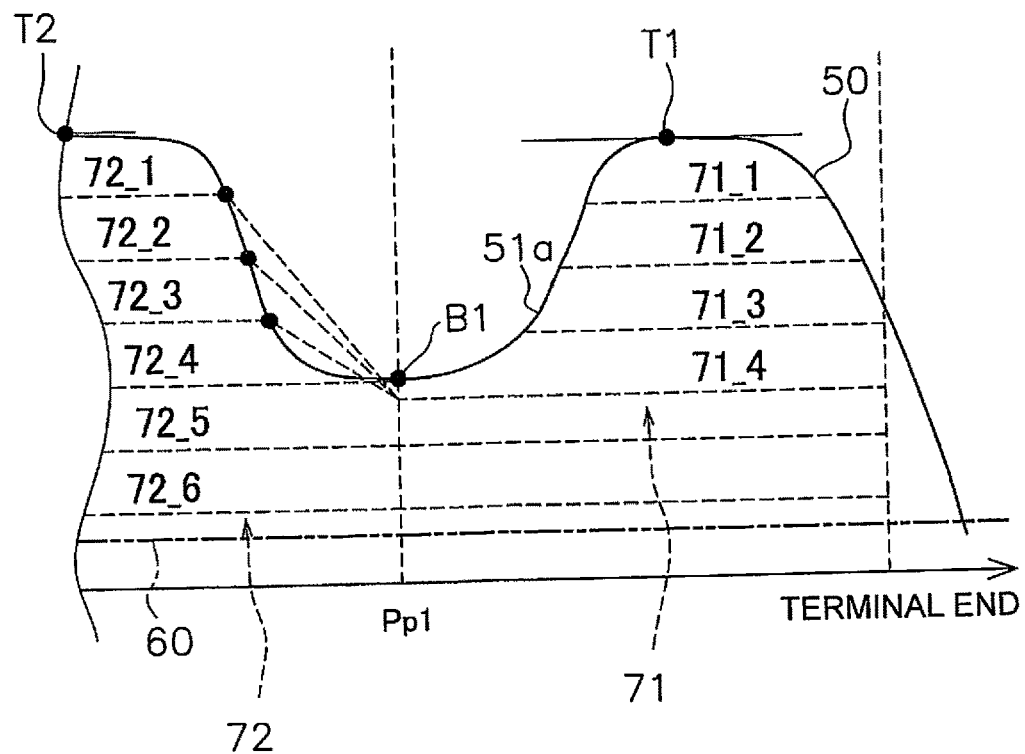
FIG. 15 is a diagram showing a second modification of the target design topography.

Alternatively, as illustrated in FIG. 15, the controller 26 may determine a plurality of the first target design surfaces 71_1-71_4 downwardly apart from each other by the predetermined distance A3 from the vertex T1 of the actual topography 50 in the first area, and may determine the first target design surface 71_4 that firstly exceeds below the bottom B1 of the first recess 51a as the lowest first target design surface.

Figure 16:
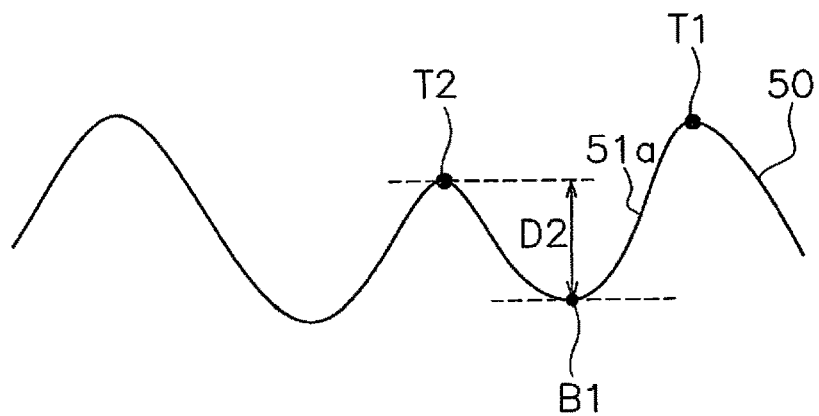
FIG. 16 is a diagram illustrating a second example of the definition of the depth of the recess.

In the above embodiment, the depth of the recesses 51a-51c is the distance from the highest point T0 of the actual topography 50 in the work range to the bottom of the recesses 51a-51c in the direction of gravity. However, the definition of the depth of the recesses 51a-51c may be different. For example, as illustrated in FIG. 16, the depth of the recess 51a is a distance D2 from the lower one (T2) of two adjacent vertices T1 and T2 of the undulation to the bottom B1 of the recess 51a in the direction of gravity. Alternatively, the depth of the recess 51a may be the distance from the higher one (T1) of the two adjacent vertices T1 and T2 of the undulation to the bottom B1 of the recess 51a in the direction of gravity.

In the above embodiment, the controller 26 acquires the depth of the recesses 51a-51c as the size of the recesses 51a-51c. However, the controller 26 may acquire another size of the recesses 51a-51c as the size of the recesses 51a-51c. For example, the controller 26 may acquire the length of the recesses 51a-51c as the size of the recesses 51a-51c.

Figure 17:
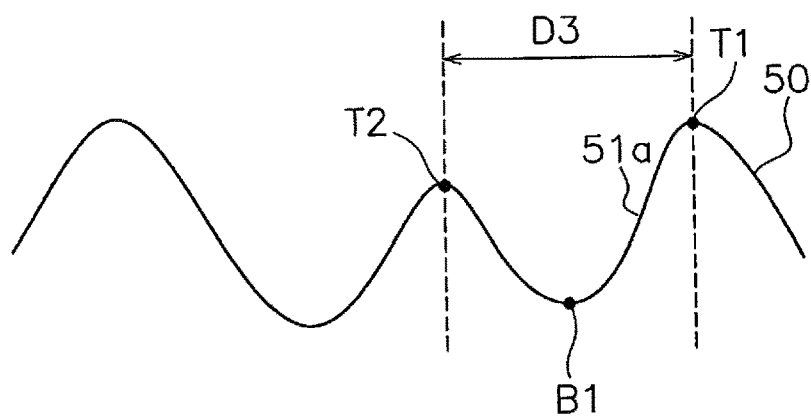
FIG. 17 is a diagram showing a first example of a definition of a length of the recess.

For example, as illustrated in FIG. 17, the length of the recess 51a may be a distance between two adjacent vertices T1 and T2 of the undulation. Specifically, the length of the recess 51a may be the distance D3 in the horizontal direction between the vertices T1 and T2. In this case, the controller 26 determines the first area and the second area divided at the position of the recess 51a when the length of the recess 51a is larger than the recess threshold.

Figure 18:
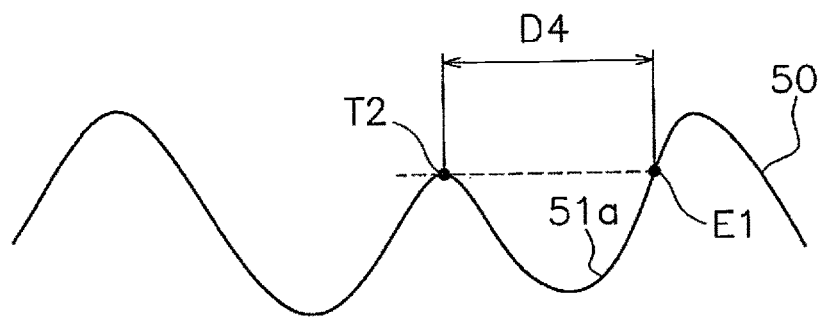
FIG. 18 is a diagram showing a second example of the definition of the length of the recess.
Figure 19:
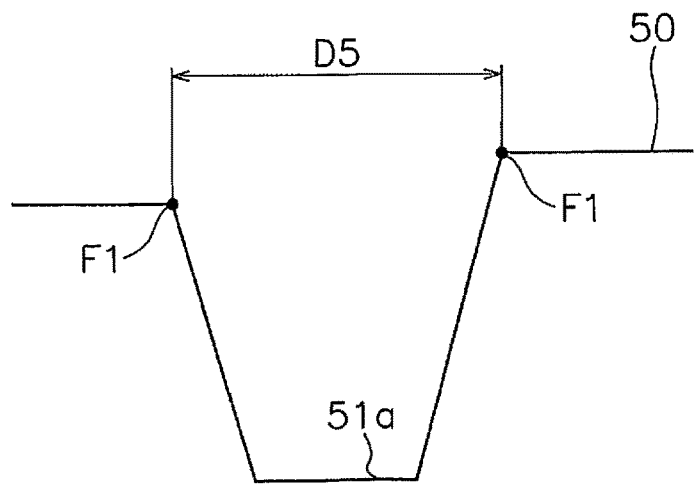
FIG. 19 is a diagram illustrating a third example of the definition of the length of the recess.

Alternatively, as illustrated in FIG. 18, the length of the recess 51a may be a distance D4 between the lower one (T2)

of the two adjacent vertices T1 and T2 of the undulation and a node E1 between the tangent line and the actual topography 50. Alternatively, as illustrated in FIG. 19, the length of the recess 51a may be a distance D5 between two inflection points (or edges of the recess 51a) F1 and F2 sandwiching the recess 51a.

Figure 20:
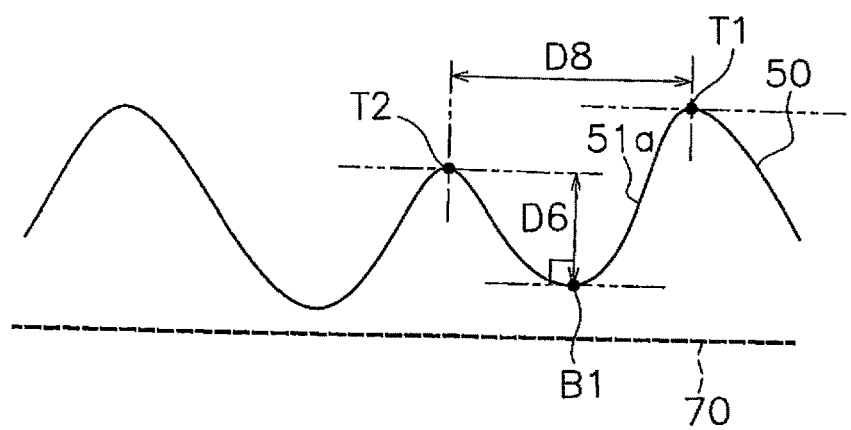
FIG. 20 is a diagram illustrating a fourth example of the definition of the depth and length of the recess.
Figure 21:
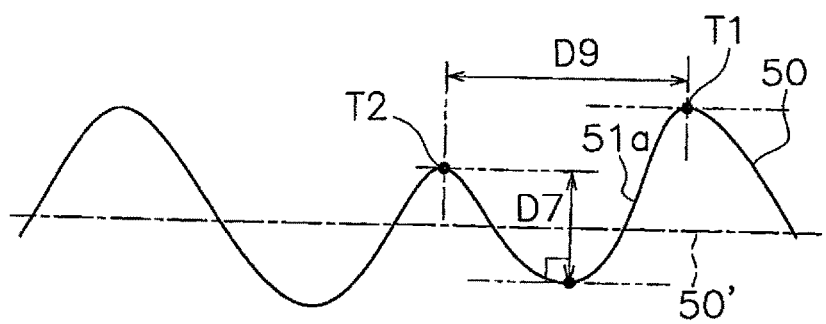
FIG. 21 is a diagram showing a fifth example of the definition of the depth and length of the recess.

The depth of the recesses 51a-51c is not limited to the distance in the direction of gravity, and may be a distance in another direction. For example, as illustrated in FIG. 20, the depth of the recess 51a may be a distance D6 in the normal direction of the target design topography 70. Alternatively, as illustrated in FIG. 21, the depth of the recess 51a may be a distance D7 in the normal direction of the approximate straight line 50' of the actual topography 50.

Similarly, the length of the recesses 51a to 51c described above is not limited to the distance in the horizontal direction, and may be a distance in another direction. For example, as illustrated in FIG. 20, the length of the recess 51a may be a distance D8 in a direction parallel to the target design topography 70. Alternatively, as illustrated in FIG. 21, the length of the recess 51a may be a distance D9 in a direction parallel to the approximate straight line 50' of the actual topography 50.

The bottom of the recesses 51a-51c is not limited to the lowest point of the recesses 51a-51c, and may be at another position. For example, as illustrated in FIG. 20, the bottom B1 of the recess 51a may be a contact point between a straight line parallel to the target design topography 70 and the recess 51a. Alternatively, as illustrated in FIG. 21, the bottom B1 of the recess 51a may be a contact point between the recess 51a and a straight line parallel to the approximate straight line 50' of the actual topography 50.

The vertex of the actual topography 50 is not limited to the highest point of the actual topography 50 between adjacent recesses, and may be another position. For example, as illustrated in FIG. 20, the vertices T1 and T2 of the actual topography 50 may be contact points between the actual topography 50 and a straight line parallel to the target design topography 70. Alternatively, as illustrated in FIG. 21, the vertices T1 and T2 of the actual topography 50 may be contact points between the actual topography 50 and a straight line parallel to the approximate straight line 50' of the actual topography 50.

In the present invention, when excavation is performed on uneven topography, the number of times that the work machine gets travels over the unevenness can be reduced. Thereby, a reduction in work efficiency can be suppressed.

The invention claimed is:

1. A control system for a work machine including a work implement, the control system comprising:
    a controller configured to
        acquire actual topography data indicative of an actual topography,
        acquire work range data indicative of a work range,
        acquire a size of a first recess included in the actual topography within the work range,
        determine whether the size of the first recess is greater than a predetermined recess threshold,
        determine a first area and a second area divided at a position of the first recess in the work range when the size of the first recess is larger than the predetermined recess threshold,
        determine a first target design topography for the first area, the first target design topography being indicative of a target trajectory of the work implement, and
        generate a command signal to operate the work implement according to the first target design topography.

2. The control system for the work machine according to claim 1, wherein
    the controller is further configured to
        determine a second target design topography for the second area, the second target design topography being indicative of the target trajectory of the work implement, and
        generate the command signal to operate the work implement according to the first target design topography before operating the work implement according to the second target design topography.

3. The control system for the work machine according to claim 1, wherein
    the work range includes a terminal end, and
    the first area is closer than the second area to the terminal end.

4. The control system for the work machine according to claim 1, wherein
    the size of the first recess is a depth of the first recess.

5. The control system for the work machine according to claim 1, wherein
    the size of the first recess is a length of the first recess.

6. The control system for the work machine according to claim 1, wherein
    the controller is further configured to determine the first target design topography for the first area when the size of the first recess is larger than the predetermined recess threshold and the length of the first area is larger than a predetermined length threshold.

7. The control system for the work machine according to claim 1, wherein
    the first target design topography includes a plurality of target design surfaces displaced from each other in a vertical direction, and
    the controller is further configured to operate the work implement in order from a top of the target design surfaces.

8. The control system for the work machine according to claim 7, wherein
    the target design surface located at a lowermost position among the plurality of target design surfaces is located at a same height as a bottom of the first recess, or a predetermined distance below the bottom of the first recess.

9. The control system for the work machine according to claim 1, wherein
    the controller is further configured to
        when the actual topography in the work range includes the first recess and a second recess, and both the size of the first recess and a size of the second recess are larger than the predetermined recess threshold, determine a first area, a second area, and a third area divided by a position of the first recess and a position of the second recess in the work range,
        determine the first target design topography for the first area,
        determine a second target design topography for the second area, the second target design topography being indicative of the target trajectory of the work implement,
        determine a third target design topography for the third area, the third target design topography being indicative of the target trajectory of the work implement,
        operate the work implement according to the first target design topography, operate the work implement according to the second target design topography after operating the work implement according to the first target design topography, and operate the work implement according to the third target design topography after operating the work implement according to the second target design topography.

10. The control system for the work machine according to claim 9, wherein the work range includes a terminal end, the first area is closer than the second area to the terminal end, and the second area is closer than the third area to the terminal end.

11. A method performed by a controller for controlling a work machine including a work implement, the method comprising:

acquiring a size of a recess included in an actual topography within a work range;

determining whether the size of the recess is greater than a predetermined recess threshold;

determining a first area and a second area divided at a position of the recess in the work range when the size of the recess is larger than the predetermined recess threshold;

determining a first target design topography for the first area, the first target design topography being indicative of a target trajectory of the work implement; and generating a command signal to operate the work implement according to the first target design topography.

12. The method according to claim 11, further comprising determining a second target design topography for the second area, the second target design topography being indicative of the target trajectory of the work implement; and generating the command signal to operate the work implement according to the first target design topography before operating the work implement according to the second target design topography.

13. The method according to claim 11, wherein the work range includes a terminal end, and the first area is closer than the second area to the terminal end.

14. The method according to claim 11, wherein the size of the recess is a depth of the recess.

15. The method according to claim 11, wherein the size of the recess is a length of the recess.

16. The method according to claim 11, wherein the first target design topography is determined for the first area when the size of the recess is larger than the predetermined recess threshold and the length of the first area is greater than a predetermined length threshold.

17. The method according to claim 11, wherein the first target design topography includes a plurality of target design surfaces displaced from each other in a vertical direction, and the command signal operates the work implement in order from a top of the target design surfaces.

18. The control system for the work machine according to claim 17, wherein the target design surface located at a lowermost position among the plurality of target design surfaces is located at a same height as a bottom of the recess, or a predetermined distance below the bottom of the recess.

19. A work machine comprising:

a work implement; and a controller for controlling the work implement, the controller being configured to acquire a size of a recesses included in an actual topography within a work range, determine whether the size of the recess is greater than a predetermined recess threshold, determine a first area and a second area divided at a position of the recess in the work range when the size of the recess is larger than the predetermined recess threshold, determine a first target design topography for the first area, the first target design topography being indicative of a target trajectory of the work implement, and generate a command signal to operate the work implement according to the first target design topography.

20. The work machine according to claim 19, wherein the controller is further configured to determine a second target design topography for the second area, the second target design topography being indicative of the target trajectory of the work implement, and generate the command signal to operate the work implement according to the first target design topography before operating the work implement according to the second target design topography.

* * * * *